US007222020B2

(12) United States Patent
Knight et al.

(10) Patent No.: US 7,222,020 B2
(45) Date of Patent: May 22, 2007

(54) SYSTEM AND METHOD FOR DETERMINING OIL OR MINERAL DEPOSITS

(75) Inventors: Byron F. Knight, Vienna, VA (US); Mark K. Hamilton, Clifton, VA (US)

(73) Assignee: Harris Corporation, Melbourne, FL (US)

( * ) Notice: Subject to any disclaimer, the term of this patent is extended or adjusted under 35 U.S.C. 154(b) by 289 days.

(21) Appl. No.: 10/828,584

(22) Filed: Apr. 21, 2004

(65) Prior Publication Data

US 2005/0240348 A1 Oct. 27, 2005

(51) Int. Cl.
*G01V 3/00* (2006.01)
*G01V 3/16* (2006.01)

(52) U.S. Cl. .......................................... 702/2; 324/330
(58) Field of Classification Search ................. 702/2, 702/5; 382/284; 342/191, 351, 357, 17; 348/116; 250/253; 324/330, 323, 331
See application file for complete search history.

(56) References Cited

U.S. PATENT DOCUMENTS

| | | | | | |
|---|---|---|---|---|---|
| 4,068,160 | A | * | 1/1978 | Hunt | 324/323 |
| 4,435,981 | A | * | 3/1984 | Carson et al. | 73/382 R |
| 4,686,474 | A | * | 8/1987 | Olsen et al. | 324/331 |
| 5,266,799 | A | * | 11/1993 | Steinitz et al. | 250/253 |
| 5,282,132 | A | * | 1/1994 | Trout | 702/5 |
| 5,596,494 | A | * | 1/1997 | Kuo | 702/2 |
| 5,661,649 | A | * | 8/1997 | Carson et al. | 702/2 |
| 6,502,037 | B1 | | 12/2002 | Jorgensen et al. | 702/14 |
| 6,508,316 | B2 | | 1/2003 | Estes et al. | 175/45 |
| 6,954,698 | B2 | * | 10/2005 | Tryggvason | 702/5 |
| 7,065,449 | B2 | * | 6/2006 | Brewster et al. | 702/5 |

OTHER PUBLICATIONS

Billings et al., Interpolation of Geophysical Data Using Continuous Global Surfaces, Nov.-Dec. 2002, Geophysics, vol. 67, No. 6, pp. 1810-1822.*
Phillips et al., Cost Effectiveness of Geophysical Inversions in Mineral Explorations at San Nicolas, Dec. 2001, The Leading Edge, pp. 1351-1360.*

* cited by examiner

*Primary Examiner*—John Barlow
*Assistant Examiner*—Toan M. Le
(74) *Attorney, Agent, or Firm*—Allen, Dyer, Doppelt, Milbrath & Gilchrist, P.A.

(57) ABSTRACT

A system and method determines the probability of oil or mineral deposits. At least one data collection device collects elevation slope, magnetic and gravity data sets for a predetermined area of the earth's surface. A processor receives the elevation slope, magnetic and gravity data sets and applies the gravity and magnetic data sets in a transfer function to link the elevation slope data set to the likely presence of oil or mineral deposits.

56 Claims, 6 Drawing Sheets

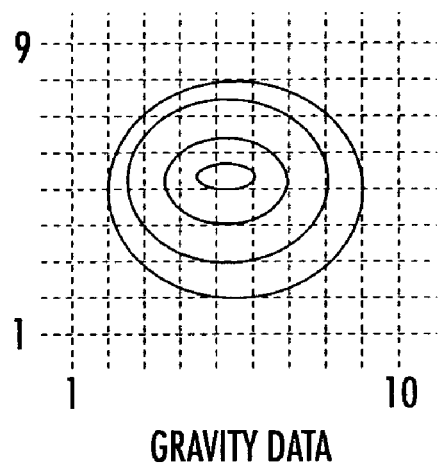
GRAVITY DATA
FIG. 5A
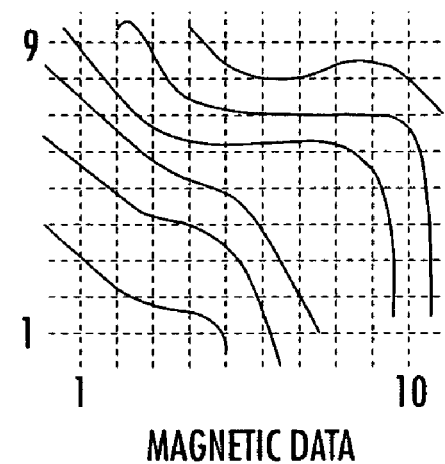
MAGNETIC DATA
FIG. 5B
$$\delta\varepsilon_x = \begin{bmatrix} 0 & 0 & 0 & 1 \\ 0 & 0 & 0 & 1 \\ 0 & 0 & 0 & 0 \\ 1 & 1 & 0 & 0 \\ 2 & 0 & 0 & 0 \end{bmatrix}$$
FIG. 6A
$$\delta\varepsilon_y = \begin{bmatrix} 1 & 1 & 1 & 1 & 1 \\ 1 & 1 & 1 & 1 & 0 \\ 0 & 1 & 2 & 2 & 2 \\ 1 & 2 & 1 & 1 & 1 \end{bmatrix}$$
FIG. 6B
FIG. 7A
FIG. 7B $$\delta\epsilon x + \delta\epsilon y = \begin{bmatrix} \uparrow & \uparrow & \uparrow & \square & \square \\ \uparrow & \uparrow & \uparrow & \square & \rightarrow \\ \bullet & \square & \square & \Uparrow & \Uparrow \\ \square & \square & \square & \uparrow & \uparrow \\ \square & \square & \uparrow & \uparrow & \uparrow \end{bmatrix}$$

FIG. 8

$$\delta\gamma x + \delta\gamma y = \begin{bmatrix} \rightarrow & \rightarrow & \rightarrow & \rightarrow & \rightarrow \\ \rightarrow & \rightarrow & \rightarrow & \square & \square \\ \rightarrow & \rightarrow & \square & \square & \Uparrow \\ \rightarrow & \square & \square & \uparrow & \Uparrow \\ \rightarrow & \square & \square & \uparrow & \uparrow \end{bmatrix}$$

FIG. 9

$$\delta\mu x + \delta\mu y = \begin{bmatrix} \rightarrow & \rightarrow & \rightarrow & \rightarrow & \rightarrow \\ \rightarrow & \rightarrow & \rightarrow & \rightarrow & \rightarrow \\ \rightarrow & \rightarrow & \bullet & \bullet & \bullet \\ \rightarrow & \rightarrow & \rightarrow & \rightarrow & \square \\ \rightarrow & \rightarrow & \rightarrow & \rightarrow & \square \end{bmatrix}$$

FIG. 10

SYSTEM AND METHOD FOR DETERMINING OIL OR MINERAL DEPOSITS

FIELD OF THE INVENTION

The present invention relates to using disparate data sources for determining oil or mineral deposits, and more particularly, the present invention relates to using elevation slope, gravity, and magnetic data in a prediction algorithm for determining the presence of oil or mineral deposits in a predetermined area of the earth's surface.

BACKGROUND OF THE INVENTION

Many different types of searches are used for exploring and developing geological resources, such as oil, gas or mineral deposits. These searches are typically localized, requiring time-consuming search and evaluation teams. In some techniques used in oil and gas exploration, geological research requires laborious hands-on, on-the-ground technical data collection using gradiometers and magnetometers. Remote sensing is typically not involved in these searches, except for a cursory classification of geostrata, for example, used in slope determination.

In the last few years, commercial satellites, such as the IKONOS satellite system, have delivered commercial image data at a very high spatial resolution. For example, the IKONOS system records four channels of multi-spectral data at four meter resolution, and one pan chromatic channel at one meter resolution. Thus, the IKONOS system can deliver near photographic high resolution satellite imagery of almost any location in the world. As a result, the volume of earth-observation imagery has greatly increased.

Some oil and mineral commercial exploratory services provide remote sensing and aircraft data collection for the geological resource community by intensely analyzing contour maps. An example of this type of system is the Falcon™ airborne gravity gradiometer (AGG) from BHPBilliton that measures minute changes in the earth's gravity to explore different terrains. Gravity data compliments magnetics data and provides insights to gain access to new terrains, prioritize targets, reduce exploration time and costs, and compliment magnetics, EM and radiometrics data. In a typical device, the gradiometer unit has two gradiometers and experiences different aircraft accelerations (e.g., reference ellipsoid, latitude, earth tide and isostatic effects). The measured gradient is the subtraction of one gradiometer response from the other. As a result, most of the corrections cancel out. This unit obtains raw data, processes it with digital signal processing circuits, and provides self-gradient correction, terrain correction, and transformation to $G_{DD}$ and $g_D$.

Another technique for facilitating oil and gas exploration is disclosed in U.S. Pat. No. 6,502,037, which discloses gravity and magnetic data inversion using vector and tensor data, including the use of seismic imaging and geopressure production analysis for oil, gas and mineral exploration and development. Complicated mathematics are used to analyze data fields. There is no prediction algorithm, however. In that system, geological structures are modeled by obtaining seismic data to derive an initial density model. An inversion process uses vector or tensor components of the gravity and/or magnetic data. An initial model includes a topographic or bathymetric surface and a 2D or 3D density model, that aids in distinguishing the top of any zones of anomalous density. A lower boundary of an anomalous density zone is derived by using the inversion process. The seismic data can also be processed in depth or time using a density model from the inversion.

In U.S. Pat. No. 6,508,316, the disclosed system measures the earth's local gravity and magnetic field in conjunction with global positioning coordinates. This system focuses on a localized search and does not use a prediction algorithm. Magnetometer errors during wellbore survey operations are determined on up to three axes, with or without the use of an external reference measurement of the local magnetic field. This provides an accurate result using data from a minimum number of surveys. Any difference between the corrected transform data and reference data in the earth's coordinate system is minimized to determine model parameters.

It would be advantageous, however, if a system and method could be developed that used a predictive algorithm to determine the likelihood of oil or mineral deposits within a predetermined area of the earth's surface.

SUMMARY OF THE INVENTION

The present invention collects disparate imagery data and other data sets and uses an algorithm to exploit imagery data and find geological resources, namely oil and mineral deposits. It provides a large area classification support to characterize geological resource searches. The present invention enables a user to benefit from the vast amount of commercial, space-based imagery that is now available, and reduces the area of eyes-on analysis required to determine resource locations. An additional modeling and simulation tool can be used for geospatial customers.

The system of the present invention determines the probability of oil or mineral deposits contained within a predetermined area of the earth's surface. At least one data collection device collects elevation slope, magnetic and gravity data sets for the predetermined area of the earth's surface. A processor receives the elevation slope, magnetic and gravity data sets and applies the gravity and magnetic data sets in a transfer function to link the elevation slope data set to the likelihood of oil or mineral deposits. In one aspect of the present invention, the elevation slope, magnetic and gravity data sets are represented as gradients within matrices in which the presence of oil or mineral deposits are linked. The processor can manipulate the matrices to obtain potential signature values indicative of the presence of oil or mineral deposits within the predetermined area of the earth's surface. The processor is also operative to determine if any matrices are singular and if a resulting determinant is zero, indicative of a change and indicative of increased probability that oil or mineral deposits exist within a predetermined area of the earth's surface.

In another aspect of the present invention, at least one image of the predetermined area of the earth's surface is used to extract specific data values for the elevation slope. A probability value can be assigned for the presence of oil or mineral deposits through the transfer function based on elevation slope data sets.

In another aspect of the present invention, the elevation slope data set comprises digital terrain elevation data (DTED). The at least one collection device can be an airborne data collection platform, including a plane carrying a gradiometer or other instrument or a satellite. A camera can also obtain images of the predetermined area of the earth's surface. The at least one collection device could also include ground based magnetic and gravity sensing devices for obtaining the magnetic and gravity data sets for a predetermined area of the earth's surface. A gravity data set could comprise data indicative of a change in the earth's gravity field along the predetermined area of the earth's surface. The magnetic data set could also comprise data indicative of a change in the earth's magnetic field along a predetermined area of the earth's surface.

In yet another aspect of the present invention, the processor can establish vector representations indicative of gradients for the elevation slope, magnetic and gravity data sets. The processor applies the transfer function to the vector representations of elevation slope, magnetic and gravity data sets and links the vector representation of the elevation slope data set to determine the likely presence of oil or mineral deposits. The vector representations can be indicative of intensity as a function of location for respective magnetic and gravity data sets.

A method aspect of the present invention is also disclosed, which includes the collecting of elevation slope, magnetic and gravity data sets for a predetermined area of the earth's surface. Gravity and magnetic data sets are applied in a transfer function to link the elevation slope data set to the likelihood of oil or mineral deposits within the predetermined area of the earth's surface.

In yet another aspect of the present invention, vector representations indicative of gradients for the elevation slope, magnetic and gravity data sets can be established and the transfer function applied to the vectors to determine the likelihood of oil or mineral deposits within the predetermined area of the earth's surface.

BRIEF DESCRIPTION OF THE DRAWINGS

Other objects, features and advantages of the present invention will become apparent from the detailed description of the invention which follows, when considered in light of the accompanying drawings in which:

FIGS. 5A and 5B are graphs showing respective gravity and magnetic data presentations.

FIGS. 6A and 6B show matrices that represent the changes between coordinates x=1 to 5 and y=1 to 5.

FIGS. 7A and 7B are matrices showing vectors that point in the direction of increasing elevation with a double arrow representing a double slope value.

FIG. 8 is a matrix that is combined from the previous two matrices of FIGS. 7A and 7B to provide a two-dimensional slope representation.

FIG. 9 is a matrix showing the elevation slope data and the gravity data changes.

FIG. 10 is a matrix that shows the magnetic data.

DETAILED DESCRIPTION OF THE PREFERRED EMBODIMENTS

Figure 1:
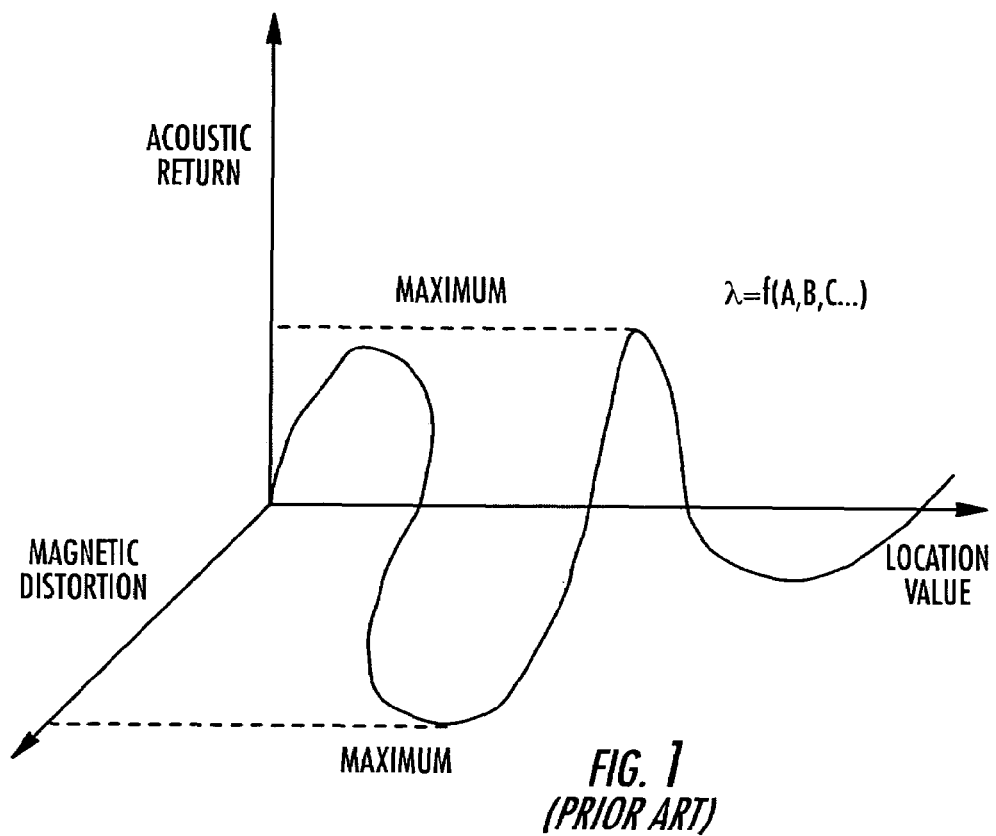
FIG. 1 is a graph showing a prior art magnetic/acoustic function that is used as an aid for determining the probability of oil or mineral deposits.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is advantageous and combines disparate physical property data types, such as magnetic data and terrain slope, when searching for oil or mineral deposits. The present invention provides an improved multi-dimensional function to determine the likelihood of finding such deposits. For purposes of understanding the present invention, a background explanation of prior art techniques, theories and proposals used in oil, gas and mineral exploration and development is set forth relative to the present invention.

One standard for determining the value of commercially gathered electro-optical imagery is the same as with any other optical system—the ability to determine an object in the field of view. This function is defined as the ability to determine the presence of two parallel lines, as compared to one line. The National Geospatial-Intelligence Agency (NGA) uses a function called Digital Terrain Elevation Data (DTED) to determine the elevation within a field of view. The DTED values for each pixel within a digital, commercial image can be considered similar to a gradient. Higher values are typically higher elevations. For example, in the commercial electro-optical satellite system IKONOS (owned by Space Imaging, Inc.), the "resolution" is commonly referred to as one meter, which is the least discernable, parallel-line, separation distance.

In the present invention, gravity and magnetic data augment the DTED "gradient." As with the terrain values obtained on the earth, gravity and magnetic values are also continuously changing. Further, these values can change for various reasons. Both values are affected by changes in the subsurface materials, or the density of the soil and metallic content (e.g., iron). It is precisely these variations, through the combination of such differing forms of data, which can help determine the presence of oil and mineral deposits.

One aspect of the present invention is an improvement over other commercially functional developments. Previous prior art techniques have shown that data fusion principles require data to be commensurable before it can be fused. The present invention does not redefine data fusion concepts, however. Instead, the present invention establishes a set of gradients for digital terrain, gravity, and magnetic data sets. From these gradients, a combined function can be defined, which relates to a unique "signature" for oil and mineral deposits. This signature could be derived from common gradient data, such as DTED slope, gravity, and magnetic data.

As noted before, some techniques combine physical property data types, including acoustic, magnetic, and commercial imagery when searching for oil and mineral deposits. Some research has focused on the potential mathematics of such functions, including database manipulation. Other approaches include matrix manipulation, which looks for potential "signature" values in the data or combination of data (e.g., singularity in a matrix determinant).

One proposed function combines acoustic and magnetic data using a location value basis. A magnetic/acoustic function is shown in FIG. 1, which provides a "maximum" value for the two dependent variables (magnetic distortion and acoustic return). Magnetic distortion could easily be a scalar value, based on location as defined by two dimensions (x,y), or by a single variable covering a matrix of values. In either case, the magnetic and acoustic functions are tied to known physical locations.

This technique suggests that the combination of two-dimensional, time snapshot, imagery data with one-dimensional, time varying, acoustic data might be challenging. The function such as shown in FIG. 1 may solve this problem. Some variation of superposition could provide a combined function λ. Any changes in the data (e.g. local maximum, local minimum, constant slope, etc.) could be determined. Superposition, however, assumes that commensurate data can be combined after mathematic manipulation. Acoustic return data could be defined by its maximum intensity as a function of location. A maximum value is chosen to remove the time dependence, assuming it is a critical value of interest.

$$\alpha = f(x,y)$$

Similarly, magnetic distortion data could be defined by its intensity as a function of location, which assumes that it is invariant with time.

$$\beta = f(x,y)$$

Because imagery data is typically its intensity as a function of location (data collection references a specific time), the acoustic and magnetic data could be an "overlay" on the image, providing a pattern of interest for locating oil and mineral deposits.

Some techniques have analyzed data format and data types of interest from commercial imagery and acoustic and magnetic data collections, suggesting that unique values (pixel intensity, acoustic spectrum, and magnetism), and derived functions (pixel change, subsurface contours, and deposit detection) could be presented for analysis. Table 1 is an example of data collected from commercial imagery, acoustics and magnetics, which can be compared, allowing different types of data format and data types to be presented.

TABLE 1

Data Set Comparisons for Commercial Imagery, Acoustics and Magnetics

| Data Set | Data Format | Data Types |
| --- | --- | --- |
| Commercial Imagery | X-Y coordinate based gray scale Surface contour mapping | Unique pixel values (e) Pixel change values $\left(\frac{de}{ds}\right)$ |
| Acoustic Mapping | X-Y coordinate spectrum Sub-surface contour mapping | Unique coordinate spectrum (f) Derived sub-surface contours f (x, y, λ) |
| Magnetic Detection | X-Y coordinate linear values Sub-surface deposit mapping | Magnetic coordinate values (g) Derived sub-surface deposit detection $\left(\frac{dg}{ds}\right)$ |

TABLE 1-continued

Data Set Comparisons for Commercial Imagery, Acoustics and Magnetics

One problem with combining this type of acoustic and magnetic data set is its time-dependence. In a traveling wave, acoustic returns are highly time-dependent. While this data can be combined to form various products (e.g., a value indicative of the possibility of oil/mineral deposit locations), it is typically localized and not remotely collectable.

The present invention solves this problem and shifts to the combination of gravity and magnetic data, which is assumed to be time-static. Both functions could be portrayed with intensity as a function of location.

$$\gamma = g(x,y)$$

$$\mu = m(x,y)$$

It should be understood that there are some known techniques used for "knowledge discovery in databases" (KDD). These techniques typically are tedious and require a significant amount of human interaction. For example, human "hints" are often used to facilitate the process. Other techniques directly mine internal business data or address security data. Another technique specifically addresses the problem of tightly coupled and loosely coupled approaches, by including meta-information, correlating entities and their attributes. This approach pre-processes the database, rendering the data usable for agent interaction and navigation.

One example illustrating this technique could be airport weather and terminal performance. Airport weather includes the fields: visibility, ceiling, barometric pressure, temperature, wind speed, and similar fields. Terminal performance includes the fields: arrival/departure cancellations, and similar fields. While these data fields appear at first to be unrelated, there are basic common attributes, for example, location and time. From this approach, it is possible to ask, "what is the arrival rate trend when temperature is below zero degrees at Dulles International Airport?" This requires any agents to have both information and database semantic knowledge. As quoted in Blake, M. B., Williams, A. B. (2002), "Information Extraction Agents for Knowledge Discovery in Relational Databases," Georgetown University Technical Report, Washington, D.C.:

"In the de-normalized models, agents would have to initially know which fields are used to relate tables. Thus, hard-coding agents to specific fields. . . . In the normalized models, though common fields are modeled in the database, agents are required to have an understanding of the other descriptive tables. Most data mining software operates automatically from the normalized tables using numerous learning algorithms."

This description suggests that while there are common (and therefore commensurable) data types, search and analysis agents must have a priori knowledge of the data set. If this hypothesis were to be true, the potential automated combination of commercial imagery, gravity, and magnetic data would be limited.

As noted before, there are some systems that address both gravity and magnetic data collection for searching for oil or mineral deposits. The BHP FALCON service described above uses airborne collection platforms, which facilitates timely, large area analysis. When measuring dyke separation, this system provides low noise (5 Eo RMS), 300-meter spatial resolution (80-meter terrain clearance; 100-meter line spacing). Excellent detection exists for nickel/platinum group metals, copper, zinc, iron, and manganese, with good results for diamond. The change in earth gravity field measurement is detectable even in the presence of non-ferrous metals.

As noted before, commercial imagery, for example, the IKONOS system, has a nominal 1-meter resolution and in some specialty cases, 0.62-meter resolution has been achieved. Multiple, high-resolution data collection of the same location can be processed to provide Digital Terrain Elevation Data (DTED), as defined by the National Geospatial-Intelligence Agency (NGA).

Figure 2:
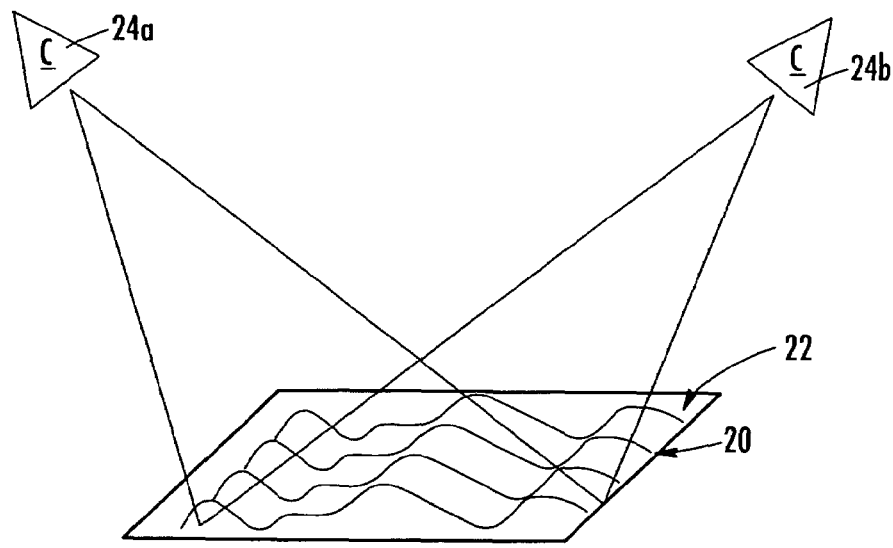
FIG. 2 is a fragmentary, isometric drawing that shows multiple observations and imaging for Digital Terrain Elevation Data (DTED).

FIG. 2 shows a simplified approach, allowing parallel ground tracks 20 to be collected in the same image area 22 by multiple cameras 24a, 24b.

Figure 3:
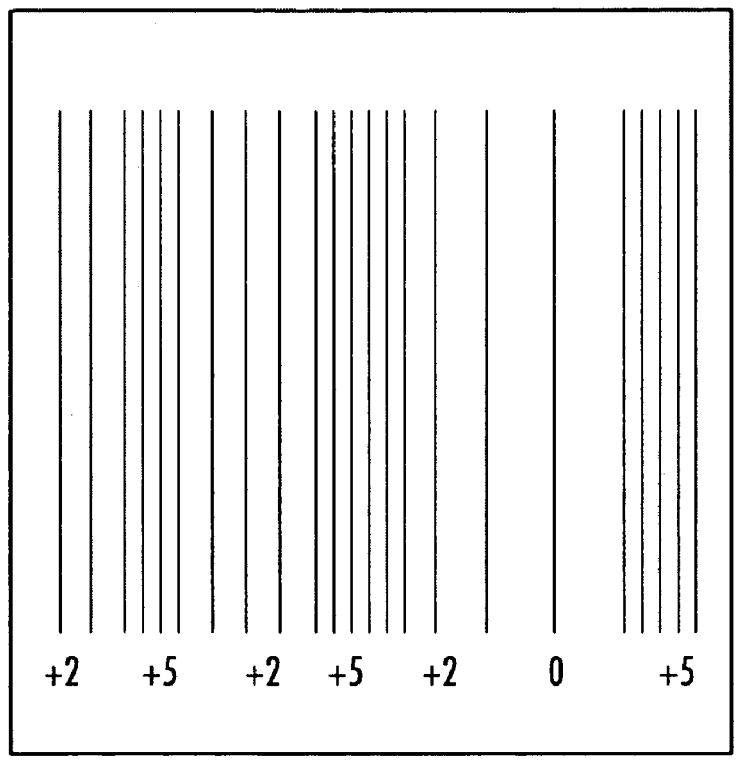
FIG. 3 is a fragmentary plan view showing a one-dimensional elevation gradient.

FIG. 3 shows a one-dimensional elevation gradient with the closer spaced lines representing higher angle slopes and the wider spaced lines representing low angle slopes. In the case of a perfectly fat, level surface, the lines would be infinitely spaced.

NGA often uses a reference termed a "datum," which is defined as any numerical or geometrical quantity or set of such quantities, serving as a reference or base for other quantities. A horizontal datum is used for a horizontal survey in which the curvature of the earth is considered. A vertical datum is used to define elevation.

Figure 4A:
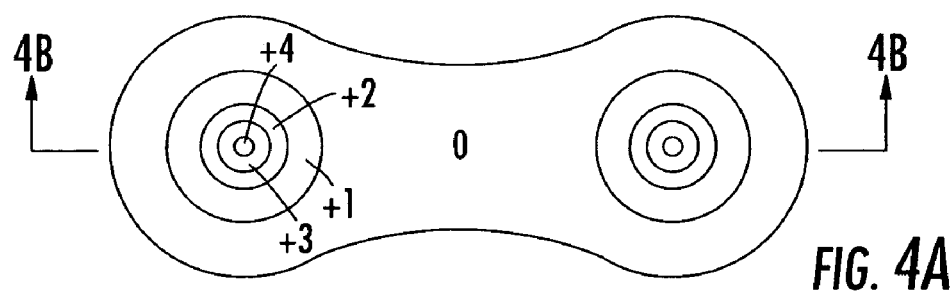
FIGS. 4A and 4B are respective plan and elevation views showing slope data extracted from elevation data.
Figure 4B:
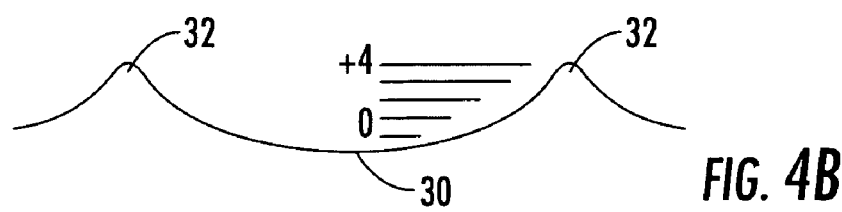

FIG. 4A shows a three dimensional DTED reference, with an elevation "slice" shown in FIG. 4B. There is a slight curvature in the "valley" 30 between the "peaks" 32. Elevation references (e.g., "+4" in FIG. 4B) represent changes in elevation for a given granularity. If the elevation does not cross a reference threshold, another line is not included. For example, a given elevation reference could be 0.5 meter low, but the granularity is in 1 meter steps. Based on this approach, a mapping of an oil/mineral field in this manner would provide geo-referenced elevations, which could be added to gravity and magnetic data.

Similar to the collection of DTED gradient data, the gravity and magnetic contour data can be collected. An example of the collection of such data is shown in FIGS. 5A and 5B, showing only one representation, which could easily be represented in different forms. In this example, the gravity data in FIG. 5A is peaked near the center of the figure (coordinate 5,5), but the magnetic data in FIG. 5B is more smoothed in the same region, showing no distinct feature. Nonetheless, it should be understood there is digital elevation, gravity, and magnetic data that represents a specific location on the earth, and as a result, the presence of oil or mineral deposits can potentially be correlated to this location.

With the collection of this elevation, gravity, and magnetic data for a given location on the earth, mathematic techniques can be applied to determine common features or functions. Table 2 is a sample set of this multi-dimensional data, which can be defined similarly to the magnetic/acoustic function shown in FIG. 1.

$$\lambda = f(\epsilon, \gamma, \mu, x, y)$$

TABLE 2

Elevation, Gravity, and Magnetic Data Referenced to Location

| Location | 1 | 2 | 3 | 4 | 5 |
|---|---|---|---|---|---|
| 1 | 0; 1; 0 | 0; 1; 1 | 0; 1; 2 | 0; 2; 4 | 1; 2; 2 |
| 2 | 1; 1; 0 | 1; 2; 1 | 1; 2; 1 | 1; 3; 3 | 2; 2; 3 |
| 3 | 2; 2; 1 | 2; 3; 2 | 2; 3; 1 | 2; 4; 3 | 2; 3; 2 |
| 4 | 2; 4; 3 | 3; 4; 3 | 4; 4; 2 | 4; 3; 3 | 4; 4; 4 |
| 5 | 3; 5; 4 | 5; 5; 5 | 5; 5; 4 | 5; 4; 4 | 5; 5; 5 |

The function $\lambda$ could represent different dimensions (e.g., length, gravity grade, magnetic flux grade). Prevailing prior art theories suggest that one should not combine them. For instance, in the field of kinematics, coordinates for translations (x, y, z) are often mistakenly mixed with the coordinates for rotation ($\theta x$, $\theta y$, $\theta z$). The former case is a linear displacement (e.g. meters), while the later case is rotation (e.g. radians). These two types of measurements typically are not combined to form an invariant such as geometric stability, and typically must be treated separately. Similarly, the data (DTED change, gravity, and magnetic) is handled separately, unless a new approach is used.

The dependent function (metric) typically should not combine or manipulate the independent variables (e.g. elevation, gravity gradient, magnetic flux, and location coordinates). As a result, the percentage change in these values is inherently independent, using an arbitrary reference. The following matrices represents the changes between coordinates x=1 to 5 and y=1 to 5, as shown in FIGS. 6A and 6B.

Another approach to present these data is the use of vectors that point in the direction of increasing elevation, with a double arrow representing a 2x slope value, as shown in FIGS. 7A and 7B.

Because these two matrices are not square (n−1 rows/columns are elevation difference measurements), they could be combined to provide a two-dimensional slope representation, as shown in FIG. 8.

No matter the presentation style, an easy-to-interpret elevation slope data for combination with gravity and magnetic data can be presented as indicated.

The same approach can be used with gravity and magnetic data as was presented for elevation change data. Because gravity and magnetic field data are often presented as gradients, this data allows vector representations. To avoid any problems with measurement units, percentage change values are recorded, using 0 through 10 (0 represents the lowest measured value and 10 represents the highest). As with the elevation slope data, the gravity data changes could be presented in a matrix as shown, for example, in FIG. 9.

Similarly, the magnetic data could be presented in a matrix, as shown, for example, in FIG. 10.

The fusion of these data types typically must be commensurate and have a common reference to be combinable. With elevation slope, gravity, and magnetic data, they all use change values (assumed to be invariant) and are referenced to a specific x,y location.

The key to combining these physical data (slope and force) is relatively straight forward if the assumption is made that common location and data change values are commensurate. Some data fusion efforts, for example, data mining, product pedigree, and similar techniques, have confronted the difficulties of extracting usable, combinable, verifiable data. The present invention is adaptable to data fusion because elevation, gravity and magnetic data measurements are numeric by definition. The automated combination can be provided by the application of vector mathematics.

The present invention simplifies the locating of oil and mineral deposits. In the present invention, any correlation between elevation slope data and oil/mineral deposit location could be determined using gravity and magnetic data. Eventually, these oil/mineral presence predictions could be performed without having to be on the ground measuring the gravity and magnetic data directly, or using airborne gradiometers could be used. Once a correlation between elevation change, gravity and magnetic data is determined, an independent function could be developed to find oil and mineral deposits with commercially collected imagery, removing one high-cost portion of field exploration.

The following function represents the combination of elevation, gravity and magnetic vectors as explained above.

$$\lambda = f(\epsilon, \gamma, \mu, x, y) = \delta\epsilon + \delta\gamma + \delta\mu$$

It has been suggested that a combined function for disparate data sets is not possible because the data sets are not commensurate, meaning there are no common features or functions describing these data. The present invention, on the other hand, is a combination function, which is unique to disparate data sets, where the only common feature in the data is the latitude and longitude.

The present invention allows new data fusion from disparate data. Usually data must be commensurable before it can be fused. This principle assumes that only data of a common measure or feature can be fused, for example, pixel intensity or photon count as the raw data measured by electro-optical sensors. A large number of pixels can be used to produce an image, which then can be precisely located. It is the location of some element within the image that can then be fused with other data. While the measurements may be disparate, the data being fused is not.

The disparate nature of these data is the uncommon specific values for elevation (distance), gravity (force), and magnetic (force) data. These data have not been combined in the past to present any unique solution for determining a physical feature, such as oil or mineral deposit location. A common feature is required, for example, the latitude and longitude of the given data collection (elevation, gravity, and magnetism). Because these data sets do not have similar values, this combination has the potential to provide a "pointer" for the presence of oil and mineral deposits.

Gravity and magnetic measurement, by definition, lend themselves to gradient mathematics and therefore matrix manipulation. Linear algebra, and the manipulation of matrices, can provide indicators for large volumes of technically collected data such as these. For instance, while a matrix determinant typically does not apply to physical data matrices, it does apply to anomalies. If a matrix row is a linear combination of some other group of rows in the same matrix, it is deemed to be "singular" and the determinant is equal to zero. This indicator would be a flag to geologists or other analysts that something is different in the combined data indicative of oil or mineral deposits. A basic approach of the present invention is the linear combination of the gradient matrices (elevation slope, gravity, and magnetic data sets), using coefficients ρ, such as shown in FIG. 11.

Figure 12:
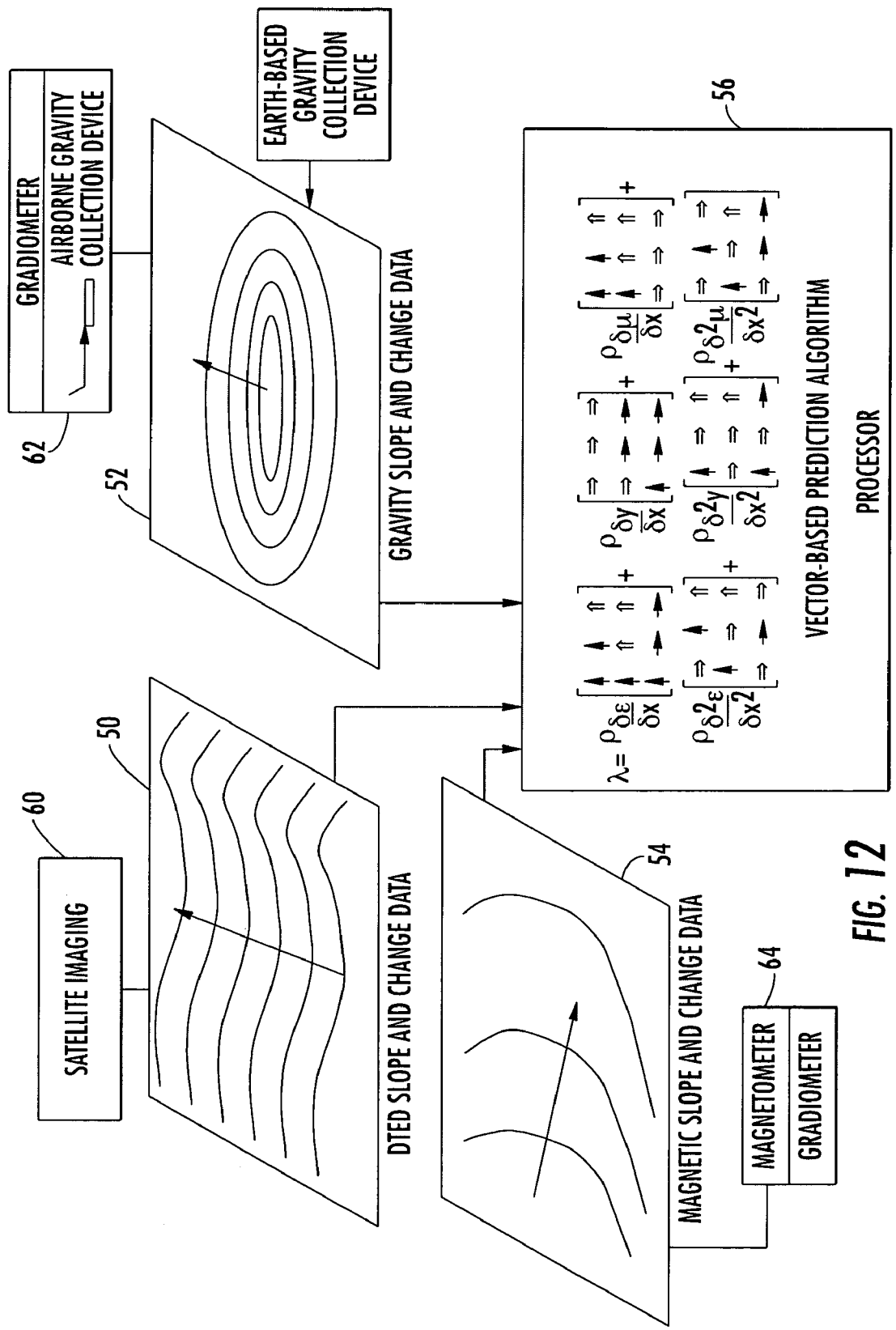
FIG. 12 is a fragmentary drawing view of the system of the present invention and showing various data collection devices that collect DTED slope and change (gradient) data, magnetic slope and change data, and gravity slope and change data, which are processed to form a vector-based prediction algorithm within a processor.

FIG. 12 shows how DTED slope and change data 50, gravity slope and change data 52, and magnetic slope and change data 54 are factored into a vector-based prediction algorithm within a processor 56. The DTED slope and change data 50 can be received from satellite images 60, for example, the commercially available satellite systems as noted before. The gravity slope and change data 52 could be received from an earth-based gravity collection device 62a or an airborne gravity collection device 62b, such as a gradiometer as explained before. The magnetic slope and change data 54 could be obtained through a commercially available gradiometer 64 or other type of magnetometer, as known to those skilled in the art.

Figures 11, 13:
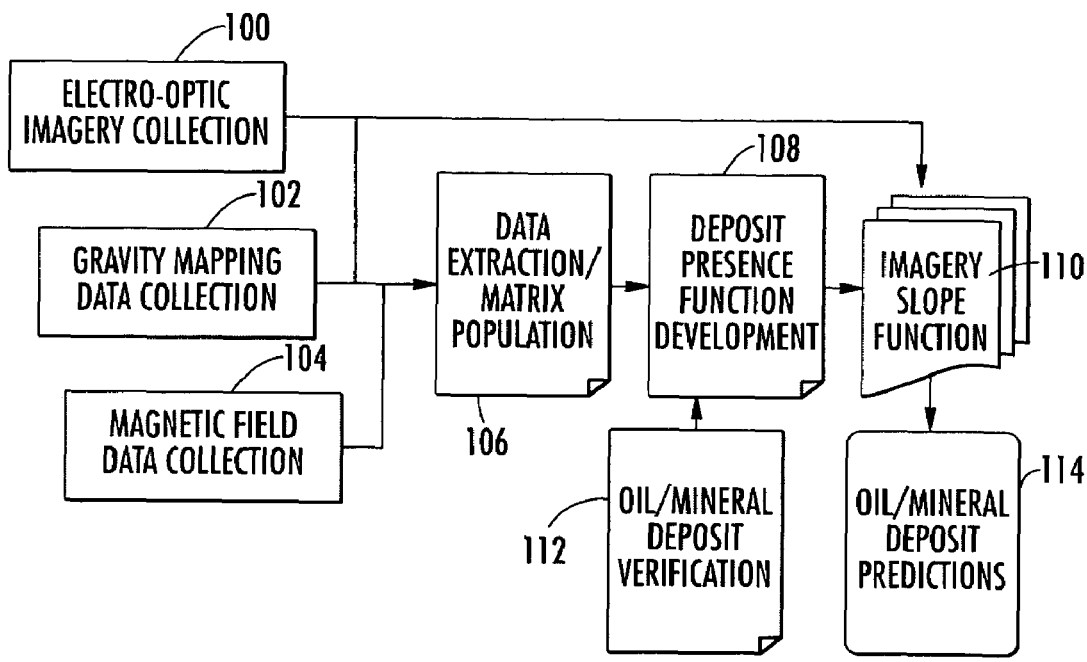
FIG. 11 is a matrix showing the linear combination of gradient matrices for elevation slope, gravity and magnetic data sets.
FIG. 13 is a flow chart showing the transfer function development process.

The flow chart in FIG. 13 shows one example of a method that can be used in the present invention for developing a transfer function (λ) and extracting the probability of oil/mineral deposits from commercial imagery data.

As illustrated, a collection or data set of electro-optic imagery date (block 100), a collection or data set of gravity mapping data (block 102), and a collection or data set of magnetic field data (block 104) are input into a processor, one portion having a data extraction/matrix population function (block 106). This is operative and processed as to the deposit presence and function development (block 108), and the imagery slope function (block 110), which also receives the input data 100 and 102, 104. An oil/mineral deposit verification function 112 can be input to the deposit presence function development 108 to verify the presence of oil or mineral deposits. Other systems and methodologies can be used at this point. The imagery slope function 110 processes the data, which is output as oil/mineral deposit predictions 114, thus completing the transfer function development process of this example.

With the imagery slope, gravity map, and magnetic field data sets, a series of functions can be developed to predict the presence of oil/mineral deposits. Ground truth oil/mineral location data could be gathered to verify the location of these deposits as noted before. A function of the present invention can be completed and verified to link elevation slope data with the presence of oil/mineral deposits, using gravity and magnetic data as the transfer function. When a slope of a specific form is seen in an image, a probability value could be assigned through this transfer function.

Specific signatures could also be extracted from commercial imagery data sets to predict the presence of oil/mineral deposits. These signatures can be added as overlays to earth maps.

In the present invention, elevation slope data is correlated to gravity and magnetic data to predict the presence of oil and mineral deposits. By using gravity and magnetic data to detect the presence of these deposits, a transfer function is developed. Ground-truth detection of various oil and mineral fields could be used to correlate these data sets. Eventually, some gravity and magnetic data would be unnecessary, and a location transfer function (elevation slope to oil/mineral presence prediction) could be used to aid in the search for such oil or mineral deposits.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for determining the probability of oil or mineral deposits, comprising:
    at least one data collection device for collecting elevation slope, magnetic and gravity data sets for a predetermined area of the earth's surface; and
    a processor for receiving the elevation slope, magnetic and gravity data sets and applying the gravity and magnetic data sets to the elevation slope data set as matrices in a transfer function to link the elevation slope data set and output and display an oil/mineral deposit prediction value indicative of the likely presence of oil or mineral deposits.

2. A system according to claim 1, wherein said elevation slope, magnetic and gravity data sets are represented as gradients with in matrices to which the presence of oil or mineral deposits are linked.

3. A system according to claim 2, wherein said process or is operative for manipulating the matrices to obtain potential signature values indicative of the presence of oil or mineral deposits within the predetermined area of the earth's surface.

4. A system according to claim 2, wherein said processor is operative to determine if any matrices are singular and are resulting determinant is zero, indicative of a change and increased probability that oil or mineral deposits exist within the predetermined area of the earth's surface.

5. A system according to claim 1, and further comprising at least one image of the predetermined area of the earth's surface through which specific data values of elevation slope can be extracted.

6. A system according to claim 1, wherein a probability value is assigned for the presence of oil or mineral deposits through the transfer function.

7. A system according to claim 6, wherein a probability value is assigned for the presence of oil or mineral deposits based on elevation slope data sets applied through the transfer function.

8. A system according to claim 1, wherein said elevation slope data set comprises Digital Terrain Elevation Data (DTED).

9. A system according to claim 1, wherein said data collection device comprises an airborne data collection platform.

10. A system according to claim 1, wherein said data collection device comprises a camera for obtaining images of the predetermined area of the earth's surface.

11. A system according to claim 1, wherein said at least one data collection device comprises ground based magnetic or gravity sensing devices for obtaining the magnetic or gravity data sets for a predetermined area of the earth's surface.

12. A system according to claim 1, wherein said gravity data set comprises data indicative of a change in the earth gravity field along the predetermined area of the earth's surface.

13. A system according to claim 1, wherein said magnetic data set comprises data indicative of a change in the earth magnetic field along the predetermined area of the earth's surface.

14. A system for determining the probability of oil or mineral deposits, comprising:
at least one data collection device for collecting elevation slope, magnetic and gravity data sets for a predetermined area of the earth's surface; and
a processor for receiving the elevation slope, magnetic and gravity data sets and establishing vector representations indicative of gradients for the elevation slope, magnetic and gravity data sets and applying a transfer function to the vector representations to link the elevation slope data set and output and display an oil/mineral deposit prediction value indicative of the likely presence of oil and mineral deposits.

15. A system according to claim 14, wherein said vector representations are indicative of intensity as a function of location for respective magnetic and gravity data sets.

16. A system according to claim 14, wherein said elevation slope, magnetic and gravity data sets are represented as gradients with in matrices to which the presence of oil or mineral deposits are linked.

17. A system according to claim 16, wherein said process or is operative for manipulating matrices to obtain potential signature values indicative of the presence of oil or mineral deposits within the predetermined area of the earth's surface.

18. A system according to claim 16, wherein said process or is operative to determine if any matrices are singular and a resulting determinant is zero, indicative of a change and increased probability that oil or mineral deposits exist within the predetermined area of the earth's surface.

19. A system according to claim 14, and further comprising at least one image of the predetermined area of the earth's surface through which specific data values of elevation slope can be extracted.

20. A system according to claim 14, wherein a probability value is assigned for the presence of oil and mineral deposits through the transfer function.

21. A system according to claim 20, wherein a probability value is assigned for the presence of oil or mineral deposits based on elevation slope data sets applied through the transfer function.

22. A system according to claim 14, wherein said elevation slope data set comprises Digital Terrain Elevation Data (DTED).

23. A system according to claim 14, wherein said data collection device comprises an airborne data collection platform.

24. A system according to claim 14, wherein said data collection device comprises a camera for obtaining images of the predetermined area of the earth's surface.

25. A system according to claim 14, wherein said at least one data collection device comprises ground based magnetic and gravity sensing devices for obtaining the magnetic and gravity data sets for a predetermined area of the earth's surface.

26. A system according to claim 14, wherein said gravity data set comprises data indicative of a change in the earth gravity field along the predetermined area of the earth's surface.

27. A system according to claim 14, wherein said magnetic data set comprises data indicative of a change in the earth magnetic field along the predetermined area of the earth's surface.

28. A method for determining the probability of oil or mineral deposits, which comprises:
collecting elevation slope, magnetic and gravity data sets for a predetermined area of the earth's surface; and
applying the gravity and magnetic data sets as matrices in a transfer function with the elevation slope data set as a matrix to link the elevation slope data set and outputting and displaying an oil/mineral deposit prediction value indicative of the likely presence of oil or mineral deposits within the predetermined area of the earth's surface.

29. A method according to claim 28, which further comprises representing the elevation slope, magnetic and gravity data sets as gradients within matrices to which the presence of oil and mineral deposits can be correlated.

30. A method according to claim 29, which further comprises manipulating the matrices to obtain potential signature values indicative of the presence of oil and mineral deposits.

31. A method according to claim 29, which further comprises determining if any matrices are singular and a resulting determinant is zero, indicative of a change and greater probability that oil or mineral deposits exist within the predetermined area of the earth's surface.

32. A method according to claim 28, which further comprises extracting specific values from imagery data sets to predict the presence of oil or mineral deposits within the predetermined area of the earth's surface.

33. A method according to claim 32, which further comprises assigning a probability value for the presence of oil and mineral deposits through the transfer function.

34. A method according to claim 33, which further comprises assigning a probability value for the presence of oil and mineral deposits based on elevation slope data through the transfer function.

35. A method according to claim 28, which further comprises collecting elevation slope data as Digital Terrain Elevation Data(DTED)

36. A method according to claim 28, which further comprises collecting elevation slope data from an airborne collection platform.

37. A method according to claim 28, which further comprises collecting elevation slope data from images of the predetermined area of the earth's surface.

38. A method according to claim 28, which further comprises collecting magnetic and gravity data sets from ground based magnetic and gravity sensing devices.

39. A method according to claim 28, which further comprises measuring a change in the earth gravity field along the predetermined area of the earth's surface for obtaining the gravity data.

40. A method according to claim 28, which further comprises measuring a change in the earth magnetic field along the predetermined area of the earth's surface for obtaining the magnetic data.

41. A method for determining the probability of oil and mineral deposits, which comprises:
    collecting elevation slope, magnetic and gravity data sets for a predetermined area of the earth's surface;
    establishing vector representations indicative of gradients for the elevation slope, magnetic and gravity data sets;
    applying a transfer function to the vectors; and outputting and displaying an oil/mineral deposit prediction value indicative of the likely presence of oil or mineral deposits within the predetermined area of the earth's surface.

42. A method according to claim 41, which further comprises representing the vectors as an intensity function of location for magnetic and gravity data sets.

43. A method according to claim 41, which further comprises representing the elevation slope, magnetic and gravity data as gradients within matrices to which the presence of oil and mineral deposits can be correlated.

44. A method according to claim 43, which further comprises manipulating the matrices to obtain potential signature values indicative of the presence of oil and mineral deposits.

45. A method according to claim 43, which further comprises determining if any matrices are singular and a determinant is zero indicative of a change and greater probability that oil or mineral deposits exist within the predetermined area of the earth's surface.

46. A method according to claim 41, which further comprises extracting specific values from imagery data sets to predict the presence of oil or mineral deposits with the predetermined area of the earth's surface.

47. A method according to claim 41, which further comprises assigning a probability value for the presence of oil and mineral deposits through the transfer function.

48. A method according to claim 47, which further comprises assigning a probability value for the presence of oil and mineral deposits based on elevation slope data through the transfer function.

49. A method according to claim 41, which further comprises collecting elevation slope data as Digital Terrain Elevation Data (DTED).

50. A method according to claim 41, which further comprises collecting elevation slope data from an airborne collection platform.

51. A method according to claim 41, which further comprises collecting elevation slope data from images of the predetermined area of the earth's surface.

52. A method according to claim 41, which further comprises collecting magnetic and gravity data sets from ground based magnetic and gravity sensing devices.

53. A method according to claim 41, which further comprises measuring a change in the earth gravity field along the predetermined area of the earth's surface for obtaining the gravity data.

54. A method according to claim 41, which further comprises measuring a change in the earth magnetic field along the predetermined area of the earth's surface for obtaining the magnetic data.

55. A system for determining the probability of oil or mineral deposits, comprising:
    at least one data collection device for collecting elevation slope, magnetic and gravity data sets for a predetermined area of the earth's surface; and
    a processor for receiving the elevation slope, magnetic and gravity data sets and applying the gravity and magnetic data sets to the elevation slope data set in a transfer function to link the elevation slope data set and output and display an oil/mineral deposit prediction value indicative of the likely presence of oil or mineral deposits as an assigned probability value based on the transfer function.

56. A system for determining the probability of oil or mineral deposits, comprising:
    at least one data collection device for collecting elevation slope as Digital Terrain Elevation Data (DTED), magnetic and gravity data sets for a predetermined area of the earth's surface; and
    a processor for receiving the DTED, magnetic and gravity data sets and applying the gravity and magnetic data sets to the DTED in a transfer function to link the elevation slope data set and output and display an oil/mineral deposit prediction value indicative of the likely presence of oil or mineral deposits.

* * * * *